United States Patent [19]

Filas et al.

[11] Patent Number: 5,676,852

[45] Date of Patent: *Oct. 14, 1997

[54] CYLINDRICAL FIBER PROBES AND METHODS OF MAKING THEM

[75] Inventors: Robert William Filas, Bridgewater; Herschel Maclyn Marchman, New Providence, both of N.J.

[73] Assignee: Lucent Technologies Inc., Murray Hill, N.J.

[*] Notice: The term of this patent shall not extend beyond the expiration date of Pat. No. 5,531,343.

[21] Appl. No.: 586,036

[22] Filed: Jan. 16, 1996

Related U.S. Application Data

[60] Division of Ser. No. 247,165, May 20, 1994, which is a continuation-in-part of Ser. No. 91,808, Jul. 15, 1993, abandoned.

[51] Int. Cl.$^6$ ............................................. C03C 15/00
[52] U.S. Cl. ............................... 216/11; 216/49; 216/97; 65/31
[58] Field of Search ............................. 216/11, 49, 52, 216/97; 65/31

[56] References Cited

U.S. PATENT DOCUMENTS

| | | | |
|---|---|---|---|
| 4,265,699 | 5/1981 | Lodany | 156/657 |
| 4,604,520 | 8/1986 | Pohl | 250/216 |
| 4,917,462 | 4/1990 | Lewis et al. | 350/319 |
| 5,018,865 | 5/1991 | Ferrell et al. | 356/376 |
| 5,105,305 | 4/1992 | Betzig et al. | 359/368 |
| 5,272,330 | 12/1993 | Betzig et al. | 250/216 |
| 5,394,500 | 2/1995 | Marchman | 385/123 |
| 5,531,343 | 7/1996 | Filas et al. | 216/11 |

FOREIGN PATENT DOCUMENTS 0 487 233 A3   11/1991   European Pat. Off. .

OTHER PUBLICATIONS

"Photon Scanning Tunneling Microscopy", by R. C. Reddick et al., *Review of Scientific Instruments*, vol. 61, No. 12, Dec. 1990, pp. 3669–3677.
"Scanned–Probe Microscopes", by H. K. Wickramasinghe, *Scientific American*, vol. 261, No. 4, pp. 98–105 (Oct. 1989).
"Atomic Force Microscope", by G. Binnig et al., *Phys. Rev. Lett.*, vol. 56, No. 9, Mar. 3, 1986, pp. 930–933.

Primary Examiner—R. Bruce Breneman
Assistant Examiner—Michael E. Adjodha
Attorney, Agent, or Firm—David I. Caplan; Martin I. Finston

[57] ABSTRACT

This invention involves a fiber probe device and a method of making it. The probe includes a relatively thick upper cylindrical portion, typically in the form of a solid right circular cylinder, terminating in a tapered portion that terminates in a relatively thin lower cylindrical portion, typically also in the form of a solid right circular cylinder, the lower portion having a width (diameter) in the approximate range of as little as approximately 0.05 μm.

7 Claims, 1 Drawing Sheet

CYLINDRICAL FIBER PROBES AND METHODS OF MAKING THEM

This is a division of application Ser. No. 08/247,165, filed May 20, 1994, which is a continuation-in-part under Rule 1.53 of application Ser. No. 08/091,808, filed Jul. 15, 1993, abandoned May 20, 1994.

FIELD OF THE INVENTION

This invention relates to probe devices, and more particularly to metrological fiber probe devices and to methods of making them.

BACKGROUND OF THE INVENTION

More than 100 years ago, the famous physicist Ernst Abbe described a fundamental limitation of any microscope that relies on any lens or system of lenses in an imaging system to focus light or other radiation: diffraction obscures (makes fuzzy) those details of the image that are smaller in size than approximately one-half the wavelength of the radiation. See "Scanned-Probe Microscopes" by H. Kumar Wickramasinghe, published in *Scientific American*, Vol. 261, No. 4, pp. 98–105 (October 1989). In other words, the resolution of the microscope is limited by the wavelength of the radiation. In order to circumvent this limitation, researchers have investigated the use of inter alia, involving "near-field scanning optical microscopy" (hereinafter "NSOM") devices. These devices typically comprise an aperture located at the tip of an elongated optical probe, the aperture having a (largest) dimension that is smaller than approximately the wavelength of the optical radiation being used, positioned in close proximity to the surface of a sample body; and the aperture is allowed to scan (move) laterally (in one or two dimensions) across the (irregular) surface of the sample body at distances of separation therefrom all of which distances are characterized by mutually equal force components exerted on the probe device in the direction perpendicular to the global (overall) surface of the sample body, the scanning being detected and controlled by an electromechanical feedback servomechanism.

For example, U.S. Pat. No. 4,604,620 inter alia describes a probe device having an aperture located at the tip of a cladder glass fiber that has been coated with a metallic layer. The aperture is drilled into the metallic layer at the tip of the fiber at a location that is coaxed with the fiber. The (immediate) neighborhood of the tip is composed of a section of solid glass fiber that has obliquely sloping (truncated conical) sidewalls, whereby the sidewalls do not form a cylinder of any kind. Therefore, as the probe device laterally scans a rough surface, the calculations required to determine the desired information on the actual contours (actual profile) of the surface of the sample body require prior detailed knowledge of the slanting contours of the sidewalls of the probe, and these calculations typically do not yield accurate metrological determinations of the desired profile of the contours of the surface of the sample body, especially at locations of the surface of the sample body where sudden jumps (vertical steps) thereof are located. In addition, fabrication of the probe device is complex and expensive, especially because of the need for drilling the aperture coaxially with the fiber.

SUMMARY OF THE INVENTION

This invention involves, in a specific device embodiment, a probe device comprising a fiber having a relatively thick upper cylindrical portion terminating in a tapered portion that terminates in a relatively thin right cylindrical lower portion; the lower cylindrical portion having maximum width in the approximate range of 0.05 µm to 10. µm and terminating at its bottom extremity in an essentially planar end surface oriented perpendicular to the axis of the thin right cylindrical portion. Other embodiments are specific in the dependent device claims. As used herein, the term "maximum width" refers to the maximum diameter—i.e., the length of the longest line segment that can be drawn in a cross section of the fiber, oriented perpendicular to the axis of the cylinder, from one extremity of the cross section to another.

The invention also involves a method of making such a probe device, as specified in the method claims and in greater detail in the Detailed Description below.

The fact that the lower portion of the probe device terminates in a planar end surface—advantageously oriented perpendicular to the axis of the cylinder—enables accurate positioning and hence position-determinations of the probe at locations of a surface of a sample body being scanned by the probe, even at sudden jumps in the surface. And the fact that the lower portion of the probe device has the form of a cylinder simplifies the determination of the profile of the surface of the sample body.

DETAILED DESCRIPTION

Figure 1:
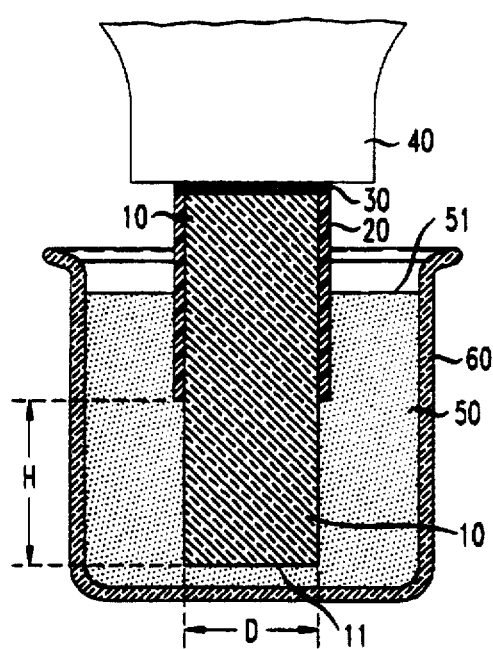
FIGS. 1–4 depict cross sections of a probe device being fabricated in accordance with a specific embodiment of the invention. Only for the sake of clarity, none of the FIGURES is drawn to any scale.

Referring to FIG. 1, a glass fiber segment 10 takes the form of a solid right circular cylinder. A top portion of the sidewall surface of this segment 10 is coated with a polymer resist layer 20 that is resistant to hydrofluoric acid etching. The glass fiber segment 10 has a bottom end face 11 that is flat and is oriented in a plane perpendicular to the axis of the (cylindrical) segment 10. A top face of the segment 10 is coated with a bonding layer 30, such as a layer of epoxy or other cement, whereby the segment 10 is bonded to a holder 40, typically made of teflon. Instead of a cement layer, a thin layer of suitable material coated with an adhesive layer on its top and bottom surfaces can be used.

Advantageously, the polymer resist layer 20 is a chlorofluorocarbon polymer dissolved in an organic solvent typically comprising a ketone or an ester or a mixture of a ketone and an ester. For example, the polymer resist is a copolymer formed by polymerizing vinylidene fluoride and chlorotrifluoroethylene commercially available as a resin from 3M Corporation under the tradename "KEL-F" Brand 800 resin, which is dissolved in amyl acetate or other suitable organic solvent to the extent of approximately 30-to-50 wt percent resin.

Figure 2:
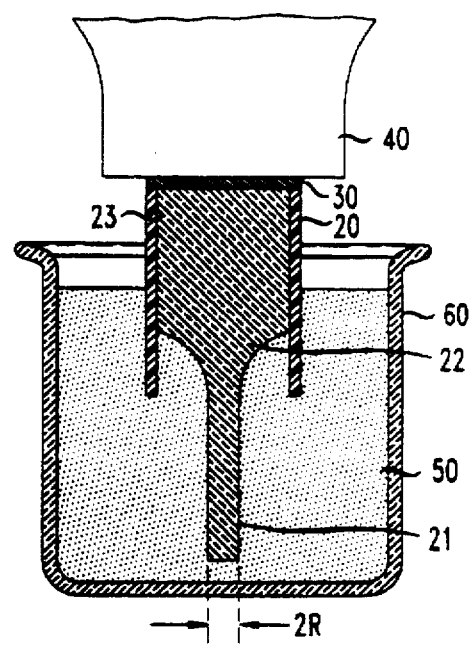

The fiber segment 10 is immersed (FIGS. 1 and 2) in a wet isotropic etch, typically a buffered oxide etching solution 50—such as a solution composed of 2 parts buffered (7:1) oxide etch, 1 part hydrofluoric acid, and 1 part acetic acid. The etching solution 50 is contained in a container 60, and it has a level 51 that intersects the resist layer 20 somewhere, whereby the entire flower) portion of the surface of the fiber segment 10 that is not coated with the resist layer 20 is submerged in the solution 50. After the fiber segment 10 has thus been immersed for a prescribed amount of time, it assumes the shape shown in FIG. 2—that is, relatively a thick upper portion 23, in the form of a solid right circular cylinder, terminating in an undercut intermediate cylindrical portion 22, in the form of a tapered truncated circular pyramid, terminating in a relatively thin lower cylindrical portion 21, in the form of another solid right circular cylinder.

For example, the height (length) H (FIG. 1) of the bottom portion of the fiber segment 10, which is not coated with the resist layer 20, is typically equal to approximately 2.5 cm; and the diameter D (FIG. 1) of the fiber segment 10 is typically equal to approximately 125. µm or more. After having been etched with the solution 50, the thin lower portion 21 has a diameter 2R (FIG. 2) equal to approximately 50. µm, as determined by the duration of the immersion.

Figure 3:
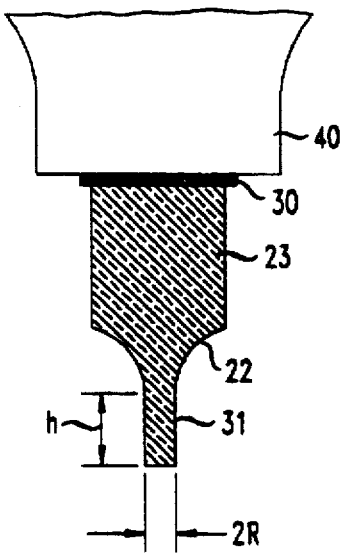

Next, the bottom face of this lower portion 21 is then cleaved in a plane oriented perpendicular to the (common) axes of the upper portion 23 and the lower portion 21, as by means of fiber cleaver aided optical microscopic viewing or other micrometer controlled procedure. In this way, the height of the lower cylindrical portion 31 is reduced to a predetermined value h (FIG. 3), and the tip thereof is a planar surface oriented perpendicular to the axis of this lower cylindrical portion 31. Typically, this height h is equal to approximately 5. µm. The resist layer 20 (FIG. I) is then removed ("stripped"), or it can be removed prior to the cleaving, such as by immersion either of the entire or of only a bottom portion of the resist layer 20 in acetone: whereby either none or only a top portion (not shown) of the resist layer 20 remains.

Figure 4:
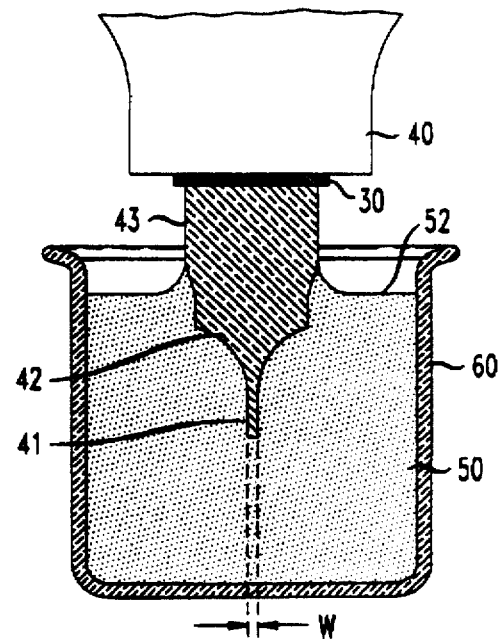

The fiber segment again is immersed (FIG. 4) in the etching solution 50, for another prescribed time duration, to a solution level 52 that intersects the segment at a level located at its thick upper portion and that isometrically etches the fiber. In this way, the resulting lower portion 41 of the fiber segment is still a solid right circular cylinder but having a reduced diameter equal to W, while the height h thereof is reduced by an unimportant amount. Likewise, the diameters of the resulting intermediate portion 42 and the upper portion 43 of the fiber are reduced by unimportant amounts. At the location of the level 52, a meniscus of the etching solution 50 produces an unimportant gradual transition between regions of the fiber immediately above and immediately below the solution level 52, as indicated in FIG. 4.

The lower portion 41, intermediate portion 42, and upper portion 43 all take the form of mutually coaxial solid circular cylinders. The diameter W of the lower portion 41—i.e., the width of the tip of the resulting probe (FIG. 4)—can be adjusted to any desired value by adjusting the amount of time during which the immersion in the solution 50 is allowed to continue. This width W can be as small as approximately 0.05 µm and as large as approximately as 10. µm or more—typically in the approximate range of 0.05 µm to 0.2 µm—depending on the ultimately desired metrological use of the probe, i.e., depending on the desired metrological resolution of the probe during subsequent use as a probe device. Typically, such use involves scanning the surface of a sample body with the probe while holding the probe with a electromechanical feedback servo-mechanism, as known in the art, that maintains the tip of the probe at distances of separation from the surface, all of which distances are characterized by mutually equal components of force in the direction perpendicular to the overall surface of the sample body. The prescribed time durations of the immersions for the etchings (FIGS. 1-2 and 4) can be determined by trial and error.

Although the invention has been disclosed in detail in terms of a specific embodiment, various modifications can be made without departing from the scope of the invention. For example, instead of glass, the fiber 10 can be made of any material—such as silica—that can be selectively etches by means of a solution while the fiber is selectively protected with a resist layer, and that can be cleaved to form a (planar) tip. Instead of isotropic wet etching, other kinds of etching techniques can be used, such as dry plasma etching. The etchings are advantageously, but need not be, isotropic. The two etching solutions (FIGS. 1-2 and 4) can be chemically different or physically different (e.g., wet in FIGS. 1-2, dry in FIG. 4).

We claim:

1. A method of making a probe device comprising the steps of:

(a) providing an initial cylindrical fiber;

(b) coating an upper cylindrical portion of the fiber with a protective layer that protects the upper cylindrical portion from etching during step (c) but does not protect a lower cylindrical portion;

(c) etching, prior to step (d), the lower cylindrical portion of the fiber for a first time duration, whereby the width of the lower cylindrical portion is reduced, but the width of the upper cylindrical portion remains essentially unchanged, said etching step carried out essentially isotropically by wet etching;

(d) cleaving the tip of the lower portion of the fiber, whereby a cleaved lower portion of the fiber is formed; and (e) etching, subsequent to step (d), the cleaved lower portion of the fiber for a second time duration, whereby the width of the cleaved lower portion is reduced to a desired value.

2. A method of making a probe device comprising the steps of:

(a) providing an initial cylindrical fiber;

(b) coating an upper cylindrical portion of the fiber with a protective layer that protects the upper cylindrical portion from etching during step (c) but does not protect a lower cylindrical portion;

(c) etching, prior to step (d), the lower cylindrical portion of the fiber for a first time duration, whereby the width of the lower cylindrical portion is reduced, but the width of the upper cylindrical portion remains essentially unchanged;

(d) cleaving the tip of the lower portion of the fiber, whereby a cleaved lower portion of the fiber is formed; and (e) etching, subsequent to step (d), the cleaved lower portion of the fiber for a second time duration, whereby the width of the cleaved lower portion is reduced to a desired value, said lower-portion etching step carded out essentially isotropically by wet etching.

3. The method of claim 2 in which the etching of step (c) is essentially an isotropic etching step.

4. The method of claim 3 in which the desired value is in the approximate range of 0.05 µm to 10. µm.

5. The method of claim 3 in which the desired value is in the approximate range of 0.05 μm to 0.2 μm.

6. A method, comprising the steps of:
   (a) providing an initial cylindrical fiber to be made into a probe device;
   (b) coating an upper cylindrical portion of the fiber with a protective layer that protects the upper cylindrical portion from etching during step (c) but does not protect a lower cylindrical portion;
   (c) etching, prior to step (d), the lower cylindrical portion of the fiber for a first time duration, whereby the width of the lower cylindrical portion is reduced, but the width of the upper cylindrical portion remains essentially unchanged;
   (d) cleaving the tip of the lower portion of the fiber, whereby a cleaved lower portion of the fiber is formed;
   (e) etching, subsequent to step (d), the cleaved lower portion of the fiber for a second time duration, whereby the width of the cleaved lower portion is reduced to a desired value; and
   (f) after step (e), moving the cleaved lower fiber portion at distances from a surface of a sample body where the forces exerted by the sample body on the said portion are mutually equal.

7. The method of claim 6, in which the cleaving of step (d) is oriented perpendicular to the axis of the lower cylindrical portion.

* * * * *